Aug. 29, 1961     W. G. WORCESTER     2,998,583
ELECTRICAL APPARATUS AND ELECTROMAGNETIC COILS
AND METHOD OF MAKING THE SAME
Filed Feb. 13, 1956     2 Sheets-Sheet 1
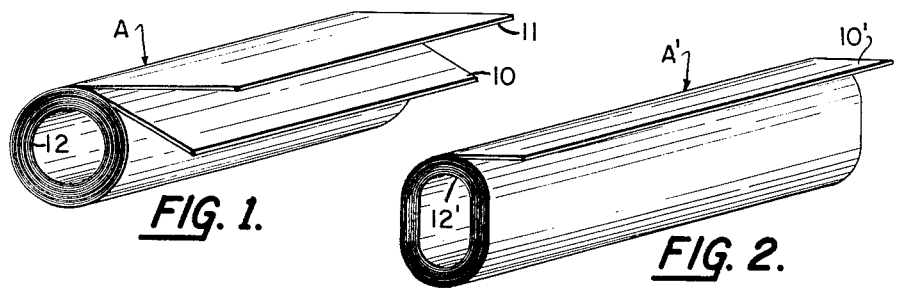
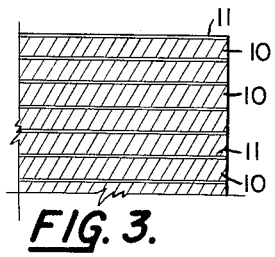
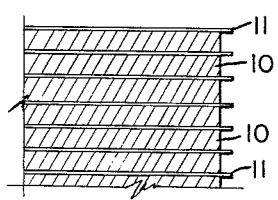
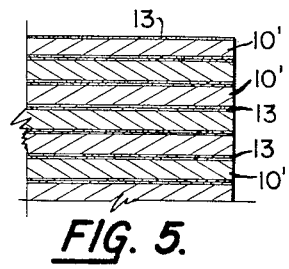
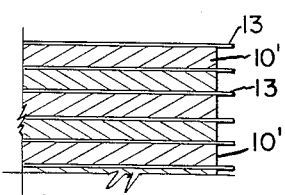
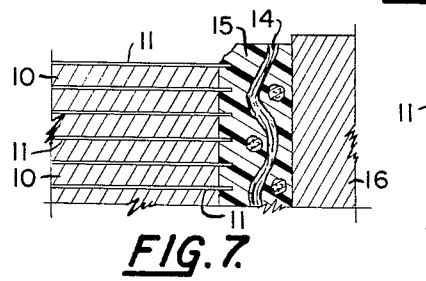
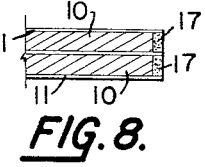
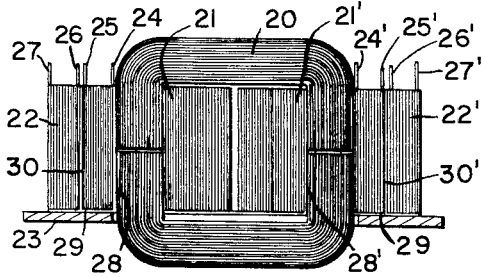
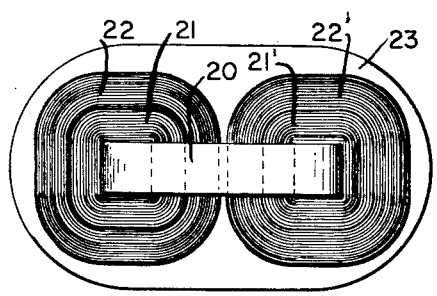
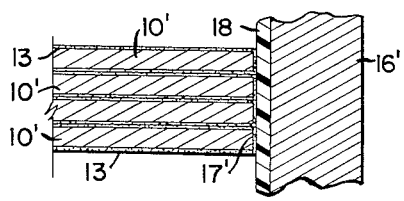
INVENTOR.
WILLIS G. WORCESTER
BY
Horace B. Van Valkenburgh
ATTORNEY

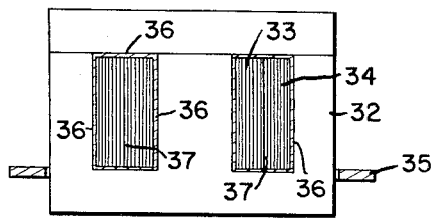
FIG. 12.
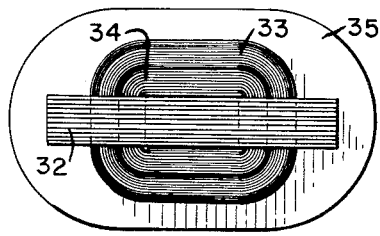
FIG. 13.
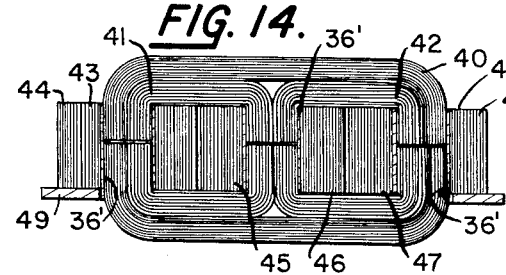
FIG. 14.
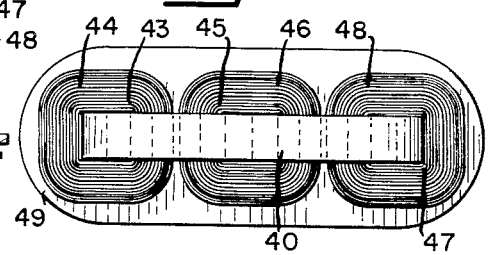
FIG. 15.
FIG. 16.
FIG. 17.
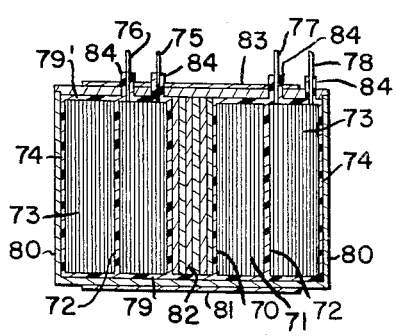
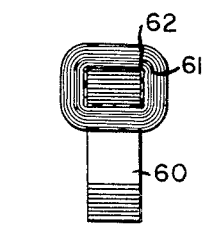
FIG. 18.
FIG. 19.
INVENTOR.
WILLIS G. WORCESTER
BY
ATTORNEY United States Patent Office 2,998,583
Patented Aug. 29, 1961

2,998,583
ELECTRICAL APPARATUS AND ELECTROMAGNETIC COILS AND METHOD OF MAKING THE SAME
Willis G. Worcester, 748 10th St., Boulder, Colo.
Filed Feb. 13, 1956, Ser. No. 564,913
3 Claims. (Cl. 336—61)

This invention relates to electrical apparatus and more particularly to electromagnetic coils and methods of making the same, as well as certain types of electrical apparatus including transformers and choke coils, in which a magnetic field is produced by a coil. This application is a continuation-in-part of my copending application Serial No. 479,315, filed January 3, 1955, and entitled "Electrical Apparatus and Electromagnetic Coils and Methods of Producing the Same."

In my aforesaid application Ser. No. 479,315, there is disclosed and claimed a method of making electromagnetic coils and a coil which may be utilized in traveling wave tube solenoids, plunger solenoids, relays, choke coils, transformers, motors and generators and other electrical apparatus, which is relatively light in weight, adequately insulated, does not tend to develop "hot spots" or localized overheating, produces a highly uniform magnetic field, may be readily provided with connections, may be made in almost any desired shape, and has numerous industrial and electronic applications. Such a coil is made from a desired length of electrically conductive metal foil, wound around a center in layers and interspaced with relatively thin insulating layers, such as a sheet of plastic or other suitable material, although the insulating layers may be integral with one or both sides of the strip. The metal foil may be aluminum or an aluminum alloy, although any other electrically conductive metal may be utilized, the lighter metals and alloys being preferred. The insulating layers may be formed from a plastic, such as "Mylar" plastic film, i.e., a resin in film form corresponding to "Dacron," a polyester of an aromatic dibasic acid and ethylene glycol, although any other suitable type of plastic or a sheet of other material, such as paper, treated or untreated, or varnish or other coating on the foil may be used. In addition, an oxide coating on one or both sides of the foil may be used as the insulating layers, as by anodizing. Thus, the insulating layers may be provided on the foil prior to winding or interspaced therewith during winding. The thickness of the foil and insulation may be varied, in accordance with the voltage, resistance, ampere-turns and other factors which affect the intensity and strength of the magnetic field to be produced. The metal foil and insulation, when separate, may be wound simultaneously on a tube which forms the center of the coil, or on a thin tube or an insulating layer which remains but may be supported by a mandrel for winding, or on a mandrel which is removed. The tube, at the center of the coil, may be made of relatively light metal, such as aluminum or aluminum alloy, while the first turn of the metal foil may conveniently be attached to the central tube in such a way that the tube may be utilized as an electrical conductor for one end of the foil. The foil or/and the insulation may be a strip from a fraction of an inch to several yards wide, while a length of insulation and foil from a few feet to several hundred yards may be utilized in one coil or a coil assembly which is used in forming a plurality of coils. In addition, the mandrel or tube about which the coil assembly is wound need not be circular in cross section, but may have any other desired cross sectional shape, such as rectangular, square, oval, polygonal with any desired number of sides and length of sides, both straight and tapering from end to end, conical, or other shape.

Among the objects of the present invention are objects similar to those of my aforesaid application Ser. No. 479,315, namely, the provision of an electromagnetic coil having the above characteristics and advantages and a method of producing the same. Additional objects are to provide additional improvements in electromagnetic coils and methods of making the same; and to provide novel transformers and choke coils which include coils of my aforesaid application Ser. No. 479,315, as well as the improved coils of the present invention.

Additional objects and the novel features of this invention will become apparent from the description which follows, taken in connection with the accompanying drawings, in which:

FIG. 1 is a perspective view illustrating the manner in which a wound assembly may be produced, in accordance with the method of my application Ser. No. 479,315, the completed assembly being used in making one or a plurality of coils;

FIG. 2 is a perspective view of an alternative manner in which a wound assembly may be produced;

FIG. 3 is a considerably enlarged, fragmentary radial section, taken at the end of a coil produced from the assembly of FIG. 1, subsequent to cutting or machining;

FIG. 4 is a similar considerably enlarged, fragmentary radial section, exemplifying the effect of etching;

FIG. 5 is a section similar to FIG. 3, taken at the end of a coil produced from the assembly of FIG. 2;

FIG. 6 is a section similar to FIG. 4, but exemplifying the effect of etching the end of the coil section of FIG. 5;

FIG. 7 is a similar fragmentary, considerably enlarged radial section, taken at the end of a coil which has been insulated and also mounted adjacent or bonded to a heat dissipating plate, which may also act to increase the intensity of the magnetic field at the end of the coil;

FIG. 8 is a similar fragmentary, considerably enlarged radial section, taken at the end of a coil of FIG. 3, the end of which is anodized to provide end insulation;

FIG. 9 is a similar fragmentary, considerably enlarged radial section, taken at the end of a coil of FIG. 5, the end of which has been anodized and which has been bonded to a heat dissipating plate;

FIG. 10 is a longitudinal section of a transformer, constructed in accordance with this invention;

FIG. 11 is a top plan view of the transformer of FIG. 10;

FIG. 12 is a longitudinal section of an alternative transformer, constructed in accordance with this invention;

FIG. 13 is a top plan view of the transformer of FIG. 12;

FIG. 14 is a longitudinal section of an additional transformer, constructed in accordance with this invention;

FIG. 15 is a top plan view of the transformer of FIG. 14;

FIG. 16 is a longitudinal section of a choke coil, constructed in accordance with this invention;

FIG. 17 is a side elevation of an alternative choke coil, constructed in accordance with this invention;

FIG. 18 is a vertical section, taken along line 18—18 of FIG. 17; and

FIG. 19 is a longitudinal section of a further alternative transformer, constructed in accordance with this invention.

The winding of a coil assembly A of FIG. 1 may be accomplished in the manner disclosed in my aforesaid application Ser. No. 479,315, and as illustrated in FIG. 1, in which a layer of thin aluminum foil 10 and a thin plastic insulating sheet 11 is being wound about a support, such as a thin aluminum tube 12, which may be rotated in any suitable manner. The aluminum foil 10 and insulation 11 may be fed to the winding operation from sheets or rolls, while the insulation 11 is preferably wider than the aluminum foil 10 so that the ends of the insulation overlap the foil. Thus, if the coil assembly A is used as a single coil, or either end thereof is utilized as the end of a coil, the insulation will insulate the foil at the ends. As the desired length or the end of the foil strip is reached, an electrically conductive tab, or series of tabs, may be attached to the foil strip 10 at a desired number of points determined by the number of individual coils to be made from coil assembly A. Foil strip 10 may then be cut transversely and several more turns of the insulating strip 11 wound on, if the coil must be insulated from the case, while the tabs if extending longitudinally from the outer ends of the foil strip 10, preferably have sufficient length that they will extend around between the additional insulating layers. Or, if desired, the outer layer may be foil, held in position by one or more bands of tape. The tabs may be attached to the end of the foil strip 10 prior to or after severing, as by soldering, resistance welding, deformation of the strip and tab, or merely by sufficient pressure that a good electrical contact or cold weld is obtained. The tabs are preferably thicker than the foil 10, to enable connections to be soldered or attached thereto without danger of breakage. The outside of the coil assembly may be taped, as adjacent each end, with one or more bands of tape, such as a fibreglass cloth impregnated with an epoxy resin, a tape formed of fibreglass and mica, a "Scotch" type tape formed of fibreglass and silicones, or tape formed of other suitable materials. The coil may then be impregnated under vacuum with a suitable bonding material, such as a resin of the so-called polyester type, i.e., a polymer formed from the reaction product of maleic anhydride, diglycol and styrene, while if higher temperatures are to be encountered a silicone rubber, such as a polymer formed from dimethylchlorosilane, may be utilized. If desired, the bonding agent may be applied during winding. However, the bonding agent used should permit curing without giving off any solvent.

The coil assembly A, if longer than the length of the coil to be made, may be cut into lengths, such as by sawing, machining or other severing operations, to produce a series of coils. Preferably, the ends of the coil assembly cut off are relatively narrow, to minimize loss due to discarding the ends when not used. Although the cuts between the coils may be perpendicular to the axis of the coil assembly, it will be understood that the cuts need not be perpendicular, but may extend at an angle thereto. Also, the cuts may be arcuate or have any other desired form of irregularity or curvature. As will be evident, the foil strip 10 is continuous from the inside to the outside so that the end of each coil may be shaped in any desired manner. Furthermore, as indicated previously, the tube need not be circular in cross section, but may have any other desired shape, while the insulating layer may be integral with the foil strip, rather than separate.

Thus, as illustrated in FIG. 2, a coil assembly A' may be formed by winding an elongated strip of foil 10', having one or both sides anodized or otherwise treated to produce an insulating film or layer of oxide or the like, on a support, such as a tube 12' having oval ends and flat sides, or any other desired cross sectional shape. As before, the tube 12' may be rotated in any suitable manner, while an electrically conductive tab or tabs may be attached to the outer end of the foil strip and the inner tube 12' may be electrically connected to the inner foil layer or other suitable electrical connection provided for the inside of the coil or coils to be produced. Also as before, the coil assembly A', when complete, may be used as a single coil or may be severed in a general transverse direction to produce two or more coils, the cut or machined ends of which may appear as in FIG. 5, wherein the anodized or oxide layers 13 form insulating layers.

After the coil assembly has been cut into a plurality of coils, or one or both ends of the coil trimmed if the final coil is to have substantially the same length as the coil assembly, the severed ends of the coils will appear somewhat as shown in FIGS. 3 or 5, depending, of course, upon the type of severing operations utilized. When the cut is made with a sharp machine tool, as on a lathe or similar type of equipment, the severed ends of the coils will be relatively smooth, while if a saw or similar type of cutting tool normally productive of a comparatively rough cut is utilized, there may be burrs and the like on the end surface, or the ends of some foil layers may be deformed slightly in one direction or the other. In FIG. 3, the thickness of the foil layers 10 and the insulating layers 11 are shown as proportional to 1¾ mils for the foil layers 10 and ¼ mil for the insulating layers 11, while in FIG. 5, the thickness of the foil layers 10 is shown as proportional to 1¾ mils and the oxidized or anodized layers 13 as about ¼ mil each, the total thickness of each insulating layer thus being proportional to ½ mil.

After the coils are cut from the coil asembly, the cut end of each coil may be etched, as in a 10% nitric acid solution or concentrated hydrochloric acid for aluminum foil, although other etching solutions may be used, or electro-polishing operations may be utilized. Etching or a similar operation is continued long enough to remove material at the ends of the foil layers or between the anodized layers for a sufficient distance back between the insulating layers, such as equal to two or more times the thickness of the insulating layers. Thus, in FIG. 4, which exemplifies the end of a coil from coil assembly A after etching, and in FIG. 6, which exemplifies the end of a coil from coil assembly A' after etching, the aluminum foil 10 may be removed back from the ends of the insulating layers 11 for a distance of approximately 1 mil, i.e., four times the thickness of the insulating layers 11 of ¼ mil, or twice the thickness of the two insulating layers 13. The distance which the aluminum foil layers is etched back will depend, of course, upon the relative thickness of the foil layers 10 and the insulating layers 11 or 13, as well as the conditions of use, including the voltage to be applied to the coil and the expected voltage between turns. Thus, the amount which the foil layers are to be etched may be varied considerably.

As illustrated in FIG. 7, the etched end of each coil may be bonded to a layer of electrically insulating material, such as a fibreglass cloth 14, which has a suitable thickness, being exemplified in FIG. 7 as having a thickness of approximately 4 mils, which while appearing comparatively large in FIG. 7 because of the scale used, is actually a very small distance. The fibreglass cloth 14 is preferably impregnated with a suitable insulating plastic or resin, which may also extend into the spaces from which the aluminum foil has been etched away. A convenient method of attaching the fibreglass cloth 14 to the end of the coil is to simultaneously apply, as by brush, a layer of insulating resin 15 which may be an "Epon" resin, i.e., an epoxy araldite, or polymer of the reaction of chlorinated ethylene oxide with a phenol, which hardens at room temperatures without giving off vapours. At the same time, or later, the impregnated fibreglass cloth 14 may also be bonded to a heat conducting plate 16, conveniently formed of mild steel to increase the strength of the magnetic field at the end of the coil. Also, the end of a coil similar to that of FIG. 6 may be similarly insulated and bonded to a heat conducting plate. Plate 16 may be on the order of about 3/16 inch thick, although other thicknesses may be used, depending on the mechanical strength desired, weight requirements and also the magnetic flux to be carried by the plate. Since a very small distance, such as only 4 to 5 mils, i.e., 00.004 to 00.005 inch, lies between the ends of the foil layers 10 and the heat conducting plate 16, it will be evident that a considerable amount of heat can be conducted between the ends of the foil layers and the heat conducting plates. As will also be evident, heat is conducted principally through the foil layers longitudinally thereof, i.e., from the center to each end, since the insulating layer 11 will tend to reduce considerably the amount of heat transmitted radially through the coil. For example, in the case of one coil constructed in accordance with this invention, it was determined that approximately 90% of the heat produced in the foil layers was conducted to the ends of the coil, while only 10% was conducted radially through the sides of the coil. Since in a wire wound coil, each turn of wire is covered with a layer of insulation, it is evident that heat generated in wires deeply buried in the winding has considerable difficulty escaping, either in the longitudinal or radial direction of the coil. Thus, such coils tend to become overheated and fail, since as a wire turn heats, the resistance increases and even more heat is generated locally because of the increase in resistance, thus leading to failure. However, in a foil wound coil, if the center of one or more layers heats up, causing the resistance in this region to increase, the current will tend to flow in cooler portions of the same turn or turns, thus tending to equalize temperatures and thereby preventing the formation of hot spots. However, coils constructed in accordance with this invention have been operated at an average winding temperature of 180° C. without failure.

In further accordance with this invention, the ends of the coils, as after machining, may be anodized to produce an insulating layer thereon, such as the layer 17 of FIG. 8, produced by anodizing the end of a coil of FIG. 3 or layer 17' of FIG. 9, produced by anodizing the end of the coil of FIG. 5. An end of such a coil may also be bonded to a heat conducting plate, if desired, as in FIG. 9, wherein the end of the coil is bonded to a heat conducting plate 16' by a layer 18 of a suitable bonding resin. The solution used for anodizing may be any suitable solution, such as a 3% chromic acid solution or a 15% to 25% sulfuric acid solution. Or, an oxide coating may be produced chemically, as by a solution of sodium carbonate and sodium or potassium dichromate.

In accordance with this invention, one or a plurality of coils produced in the manner just described may be used in various types of transformers and choke coils, such as the single phase transformers of FIGS. 10 and 11, which may be provided with a laminated or other type of core 20, such as a tape wound "C" core, as shown. A coil 21 providing one-half of the secondary winding may surround one leg of the core 20 and a similar secondary coil 21' may surround the opposite leg, while a coil 22 providing one-half the primary winding may surround the coil 21 and a similar primary coil 22' may surround the secondary coil 21'. Each of the coils 21, 21', 22 and 22' are constructed in the manner previously described, i.e., formed of metal foil and insulating layers wound about a center. One end of each coil may also be bonded to a heat conducting plate 23, as in the manner previously described. The heat conducting plate 23 is cut out at the center to accommodate core 20 and conveniently extends beyond the outer periphery of the coils 22 and 22', as in FIG. 10, to insure adequate dissipation of heat. Electrical lead connection tabs 24 and 25 may be respectively connected to the inner and outer foil layers of coil 21 and similar tabs 24' and 25' may be connected to the inner and outer layers of coil 21', while lead tabs 26 and 27 may be connected to the inner and outer layers of coil 22 and similar tabs 26' and 27' connected to the inner and outer layers of coil 22'. Additional tabs at other positions may also be used. These lead tabs may be connected or attached to the respective layers of the coils in any suitable manner, such as described previously, and may also be disposed in any suitable position for connection of the lead wires thereto, such as in positions outside of the core 20, as in FIG. 10. Also, additional secondary coils may be used. In addition, a layer of insulation 28 may surround one leg of the core 20 and a layer of insulation 28' similarly surround the other leg of core 20, to insulate the respective coils 21 and 21' from the core, while a layer of insulation 29 may be disposed between the ends of the coils and the heat conducting plate 23, with insulation layer 29 conveniently bonding the coils to the plate 23, if desired. A layer of insulation 30 may also separate the coils 21 and 22 and a similar layer of insulation 30' separate the coils 21' and 22'. The secondary coils 21 and 21' and the primary coils 22 and 22' may be formed separately and then slipped over each other in nesting relation when the respective insulation layers 30 and 30' are applied. Or, the inner secondary coils 21 and 21' may be wound separately or in a coil assembly, such as the coil assembly A of FIG. 1 or the coil assembly A' of FIG. 2, after which the insulation layers 30 and 30' may be applied and the primary coils 22 and 22' wound respectively or together on the secondary coils. The thickness of the strip used for the primary and secondary coils and/or the number of turns of foil of the respective coils should be proportioned in accordance with the relationship between the primary and secondary voltages.

As will be evident, the use of foil wound coils, as of aluminum, for the primary and secondary coils of a transformer reduces the weight, as compared with copper wire wound coils and also reduces the space occupied by the coils and therefore the space occupied by the transformer. The use of two primary and two secondary coils in a single phase transformer and also the disposition of the primary coils outside the secondary coils has numerous advantages, particularly in the case of transformers operating at higher frequencies. These advantages are due primarily to overcoming problems caused by the so-called "skin" effect, or crowding of current toward the edges of the windings or foil layers. With very low frequencies or with very narrow windings, this effect is not particularly disadvantageous but in practical sizes of transformers which operate at higher frequencies, this skin effect is quite pronounced. For instance, transformers operating at about 400 cycles per second tend to exhibit a pronounced skin effect with the result that the alternating current resistance may be ten or more times the direct current resistance. However, the skin effect can be reduced by placing one of the coils within the other coil, since the primary and secondary currents flow in opposite directions and the magnetic leakage fluxes due to these currents tend to cancel each other, so that the current will be more uniformly distributed in the foil. Also, the placement of the primary winding outside the secondary winding, i.e., removed from the core, minimizes the skin effect of the magnetizing current. Of course, in addition to the arrangement of the coils shown in FIGS. 10 and 11, the skin effect can also be minimized by interleaving the primary and secondary windings on a common form, as by winding a portion of the primary and a portion of the secondary, then another portion of the primary and another portion of the secondary, and so on, with the primary portions of the windings being suitably interconnected electrically and the secondary portions of the windings being similarly connected.

Coils made in the manner previously described may also be used in other types of transformers, such as the single phase transformer illustrated in FIGS. 12 and 13 which includes an "E" type of laminated core 32. A foil wound coil 33, providing a secondary winding, may surround the central leg of the core 32, with a foil wound coil 34 providing the primary winding surrounding the secondary coil but within the outer legs of the core. One end of each of the coils 33 and 34 may be bonded to a heat conducting plate 35 which is cut out at the center to accommodate the core 32 and also may extend outwardly beyond the outer or primary coil 34 and the core 32, as in FIG. 12, for greater heat dissipation. As before, a layer of insulation 36 may be provided between the coils 33 and 34 and the central and outer legs of the core 32, while an insulation layer 37 may separate the coils 33 and 34. Suitable tabs for connecting leads to the inner and outer or other layers of the coils 33 and 34 may be provided, as in a manner similar to that described for the transformer of FIGS. 10 and 11. As before, the coils 33 and 34 may be wound separately and then bonded together, or the coil 33 may be wound on a suitable tube or mandrel, as to provide an oblong winding corresponding to the central leg of the core 32, and after the layer 37 of insulation is applied, the outer or primary winding for coil 34 may be wound directly on the inner or secondary coil 33. Of course, a coil assembly may be made, as previously described, which may be severed at appropriate positions to produce a plurality of transformer coils, while the ends of the coils may be etched and then insulated or may be anodized to provide an insulating layer at the edge of the foil layers.

In the three phase transformer of FIGS. 14 and 15, a modified "E" core is used, which may include a tape wound outer core section 40 and a pair of tape wound inner core sections 41 and 42, disposed side by side within the outer core section 40, each core section preferably being laminated. A secondary coil 43 surrounds the common leg of the cores 40 and 41, while a primary coil 44 surrounds coil 43. Similarly, a secondary coil 45 surrounds the common leg of core sections 41 and 42, while a primary coil 46 surrounds coil 45; also similarly a secondary coil 47 surrounds the common leg of core sections 40 and 42, while a primary coil 48 surrounds coil 47. Again, one end of each of the coils may be bonded to or otherwise attached or placed adjacent a heat conducting plate 49 which, as in FIG. 14, may extend outwardly beyond the periphery of each of the coils so as to provide a better dissipation of heat away from the coils. Suitable tabs may be also provided for each of the coils, as for connecting coils 43, 45 and 47, respectively, to the connections for the three phases, such as Y or delta. Similarly, suitable tabs may be provided for the coils 44, 46 and 48 and connected in a suitable three phase relationship, such as Y or delta. While the primary coils 44, 46 and 48 are conveniently disposed outside the secondary coils 41, 43 and 45 to minimize the skin effect of the magnetizing current, the relative position of the primary and secondary coils may be reversed. Also, suitable insulation 36' may be provided to insulate the coils 43, 45 and 47 from the respective common legs of the core sections, while suitable insulation may be provided between the ends of the coils and the heat conducting plate 49, as well as between the respective primary and secondary coils. Each of the coils 43 to 48, inclusive, may be constructed in the manner previously described, while the inner and outer coils of each set may be made separately and then slipped together or the outer coil may be wound on the inner coil in the manner described previously. Or, the coils may be formed by winding a coil assembly which is later cut apart, to form single coils or sets consisting of primary and secondary coils together. In coils formed in this way, a strip of foil and insulation may be wound about a center, the center being either a mandrel which is later removed or a tube which may remain in place. Also, the insulation may be a sheet separate from the foil or may be an oxidized layer or insulating coating on the foil itself. In addition, the ends of the coils may be etched and then insulated, or the ends of the coils may be anozide to form an oxidized layer on the edges of the foil layers.

In a choke coil constructed in accordance with this invention and illustrated in FIG. 16, only one coil 50 is used, surrounding a laminated core 51 with a layer of insulation 52 between the two, as well as a layer of insulation 53 around coil 50. The ends of the coil 50 may be provided with insulating layers 54 and 54' respectively, conveniently formed as before. Also, lead tabs 55 and 55' may be connected to the inner and outer turns, respectively, of coil 50, which may be placed in a laminated steel body 56 closed by a laminated steel top 57, while insulation 58 is preferably provided for the lead tabs at the point at which they pass through the top 57. Also, the coil may be bonded to the bottom of body 56 and to the top 57, when the insulating layers 54 and 54', respectively, are applied. As before, the choke coils 50 may be made singly or in pairs, or a plurality thereof cut from the same coil assembly. The shape of core 51 of the choke coil of FIG. 15 need not be circular in cross section, but may be any other desired shape, such as a rectangle with rounded corners, oval and the like. The core 51 may also be a spiral winding of sheet transformer steel, to the outside of which the insulation layers 52 is applied, with the coil 50 then wound thereon. As will be evident, the shape of the body and/or top of the case may be varied and the extent of the laminations varied in accordance with the type of magnetic field and the extent thereof desired. The body and top also may be solid rather than laminated, if desired, although a laminated body and top may provide a lower eddy current loss.

In the choke coil illustrated in FIGS. 17 and 18, one leg of a tape wound laminated "C" core 60 may be surrounded by a foil wound coil 61 with a layer 62 of insulation therebetween. An electrical connection tab 63 may be connected to the outer layer and a tab 64 to the inner layer of coil 61, while the ends of the coil are preferably insulated. A heat conducting plate may be provided, as in a manner similar to the heat conducting plates of the transformers of FIGS. 10–15, inclusive. When a foil wound coil is used in a filter choke, certain advantages are produced due to the skin effect, which was mentioned before as being a disadvantage in the case of a transformer. Since there is only one coil and there is no coil which tends to neutralize the skin effect, a choke coil which includes a foil wound coil will have a relatively low resistance to direct current but a high resistance to alternating current, which increases as the frequency of the current increases. Thus, this property is of considerable advantage, since the resistance as well as the inductive reactance can be made to increase with increasing frequency, to enable a smaller amount of material with a consequent smaller weight to be used in order to produce the desired impedance at higher frequencies. In addition, a foil wound coil has been found to have a lesser weight than a conventional wire wound copper coil for the same direct current resistance.

In an additional single phase transformer constructed in accordance with this invention, as illustrated in FIG. 19, an insulating layer 70 may be placed upon a mandrel and a primary coil 71 may be wound thereon, the thickness of the aluminum foil layers and the number of turns being such that the desired alternating magnetic field will be produced. The mandrel for insulating 70 may be cylindrical, or may be oval or any other desired shape in cross section. Of course, the thin foil wound to make the coil 71 is interspaced with layers of insulating material, such as a separate sheet or an insulating layer provided on the foil surface prior to winding. An insulating layer 72, such as several turns of the insulating layer or tape or the like as described previously, may be placed around the primary coil 71 after which the foil layers of a secondary coil 73 may be wound on and when the desired number of turns of the secondary coil have been wound on, an outside insulating layers 74, conveniently similar to layer 72, may be applied. It will be understood, of course, that additional secondary windings or coils may be wound on the primary coil, or the primary coil layers interspaced with one or more secondary coil layers, while a coil assembly in the manner similar to the coil assembly A of FIG. 1 or coil assembly assembly A' of FIG. 2, may be made and then cut apart at desired points for production of a plurality of coils, in a manner similar to that previously described. The mandrel is removed after the separate coils have been cut apart, and the ends of the coils may then be etched, or anodized. Also, the core and coils may be wound together and severed as core-coil units at appropriate positions. This is of particular advantage when an assembly for two core-coil units is cut apart at the center and the lead tabs are interleaved or attached to desired foil layers during winding so as to extend from opposite ends of the assembly and from one end only of each of the core-coil units.

Lead tabs 75 and 76 for the primary coil and lead tabs 77 and 78 for the secondary coil may be inserted in the coils, in any suitable manner which will produce a good electrical contact with the inner and outer turns of the respective coils. The lead tabs may be attached to the respective foil layers, if installed during winding, by pressure bonding, by spot welding, by an ultrasonic soldering gun and conventional solder, or in any other suitable manner. If desired, the coil assembly may be equal in length to two transformer coils only, so that the primary and secondary leads may be attached to the inner and outer turns of the primary coil 71 and secondary coil 73, as these turns are reached during winding at each end of the coil assembly. In this instance, the ends of the coil assembly are not disturbed, since the assembly is cut apart at the center only and the cut ends of each transformer coil so produced etched or anodized. In the former instance, the etched ends of the coils may be provided with an insulating layers 79 or also 79', such as of fibreglass cloth, bonded to the machined and etched end of the transformer coil by an epoxy resin or other suitable material, which also fills the spaces between the insulating layers exposed by etching, as described previously.

The transformer coil may be placed in a case having a laminated steel body 80 and provided at the bottom, if desired, with additional laminations 81. A laminated steel core 82 may be inserted in the space within insulating layer 70 formerly occupied by the mandrel when the coils were wound, while a laminated steel top 83 may be attached to the body 80 in any suitable manner. In addition, suitable insulation 84 may be provided for each of the tabs 75, 76, 77 and 78 at the points where they pass through the laminated top 83 of the transformer case.

From the foregoing, it will be evident that the electrical apparatus and method of making the same of this invention fulfills to a marked degree the requirements and objects hereinbefore set forth. The method includes the steps of winding a plurality of layers of thin metal foil, normally interspaced with layers of insulation, then machining the ends of the coil or cutting out several coils from the coil assembly thus produced. In my application Ser. No. 479,315, this is followed by etching or the like to remove the ends of the foil layers back for a slight distance from the ends of the insulating layers, and then applying a suitable insulating layer to each end thus produced. Or, as also in accordance with the present invention, the machined ends, or unmachined ends for that matter, may be anodized or otherwise treated to form an oxidized or insulating layer at the edges of the foil layers. The above methods are quite economical to carry out, while there are no fine wires tending to break and the lead tabs can be attached to the individual coils with relative ease. An electromagnetic coil thus produced is very light in weight, compared to a wire wound coil. In addition to the weight factor, of course, electromagnetic coils constructed in accordance with this invention also have less tendency to overheat, since the heat from the center is transmitted longitudinally along each foil to the end of the coil. A transformer or a choke coil, in which a coil of this invention is utilized, is relatively simple to manufacture and not only is lighter in weight and has less tendency to overheat, but may be made in any desired shape and with any desired location of the turns of the primary and one or more secondary windings. As will be evident, the foil may be wound about a center of any desired shape, so that a laminated core of similar shape, as for a transformer or choke coil, is readily accommodated in the space so produced, while a coil of this invention can be readily made so as to replace a conventional wire wound coil in a transformer or choke coil of standard design.

Although a number of different transformers and choke coils constructed in accordance with this invention have been illustrated and described, as well as a preferred method of making coils and certain variations therein have been described, it will be understood that other changes and variations may be made. For instance in a transformer, the primary and secondary coils need not be concentric, but may be disposed axially, as about a core; or, the primary and one or more secondary windings may comprise alternating relatively thin or wafer-like coils, each constructed in accordance with this invention and disposed axially about a core. Thus, other embodiments of this invention may exist and various additional changes made, all without departing from the spirit and scope of this invention.

What is claimed is:

1. A transformer comprising a laminated core forming a closed magnetic path and having an opening in the center; a secondary coil surrounding one side of said core and insulated therefrom, said coil being formed of alternating layers of metal foil and insulation extending spirally; a similar secondary coil surrounding the opposite side of said core and insulated therefrom; a primary coil surrounding each said secondary coil and insulated therefrom, each said primary coil being formed of alternating layers of metal foil and insulation extending spirally; a heat conducting plate bonded by insulation to one end of all said coils, said plate extending transversely to the axes of said coils and outwardly beyond said primary coils and said core, said plate having a central opening to accommodate said core; and means for electrical connection to the respective inner and outer foil layers of said primary and secondary coils.

2. A transformer comprising a laminated core having laterally spaced openings providing a central leg therebetween and an outer leg at each side; a secondary coil surrounding said central leg and insulated therefrom, said coil being formed of alternating layers of metal foil and insulation extending spirally; a primary coil surrounding said secondary coil and insulated therefrom and from said core, said primary coil being formed of alternating layers of metal foil and insulation extending spirally; a heat conducting plate bonded by insulation to one end of each of said coils, said plate extending transversely to the axes of said coils and outwardly beyond said primary coil and said core, said plate having a central opening to accommodate said core; and means for electrical connection to the respective inner and outer foil layers of said primary and secondary coils.

3. In a three phase transformer, a laminated core having an outer section provided with a central, generally rectangular opening therein and a pair of inner sections disposed in side by side relation in said opening, the outside of said inner sections engaging the inside of said outer section and each said inner section having a generally rectangular opening therein, each outer end of said outer section with the outer end of an inner section forming an outer core leg and the abutting inner ends of said inner sections forming a central core leg; a secondary coil surrounding each of said legs and insulated therefrom, each said secondary coil being formed of alternating layers of metal foil and insulation extending spirally; a primary coil surrounding each said secondary coil and insulated therefrom, each said primary coil being formed of alternating layers of metal foil and insulation extending spirally; and a heat conducting plate bonded by insulation to one end of all said coils, said plate extending transversely to the axes of said coils and outwardly beyond said primary coils, said plate having a central opening to accommodate said core.

References Cited in the file of this patent

UNITED STATES PATENTS

| | | |
|---|---|---|
| 1,164,113 | Orswell | Dec. 14, 1915 |
| 1,623,345 | Hopkins | Apr. 5, 1927 |
| 1,629,132 | Thordarson | May 17, 1927 |
| 2,000,441 | Given | May 7, 1935 |
| 2,264,057 | Treanor | Nov. 25, 1941 |
| 2,267,382 | Vance | Dec. 23, 1941 |
| 2,434,511 | Osterman et al. | Jan. 13, 1948 |
| 2,455,355 | Combs | Dec. 7, 1948 |
| 2,483,159 | Somerville | Sept. 27, 1949 |
| 2,521,513 | Gray | Sept. 5, 1950 |
| 2,577,707 | Kerns et al. | Dec. 4, 1951 |
| 2,628,996 | Mayo | Feb. 17, 1953 |
| 2,696,593 | Dole | Dec. 7, 1954 |
| 2,770,785 | Haagens et al. | Nov. 13, 1956 |

FOREIGN PATENTS

| | | |
|---|---|---|
| 467,804 | Great Britain | June 23, 1937 |
| 85,138 | Switzerland | May 17, 1920 |

OTHER REFERENCES

Publication, "Copper Foil Miniaturizes Coils," Electronic Equipment, pp. 12–14, March 1955.